Feb. 5, 1929.

Re. 17,202

W. R. BROOKINS

LIQUID MEASURE

Original Filed May 2, 1927

Walter R. Brookins

INVENTOR.

Walter R. Knight

BY Bennett R. Knight

ATTORNEYS

Reissued Feb. 5, 1929.

Re. 17,202

UNITED STATES PATENT OFFICE.

WALTER R. BROOKINS, OF DAYTON, OHIO, ASSIGNOR TO BROOKINS MANUFACTURING COMPANY, OF DAYTON, OHIO, A CORPORATION OF OHIO.

LIQUID MEASURE.

Original No. 1,666,085, dated April 17, 1928, Serial No. 188,246, filed May 2, 1927. Application for reissue filed November 10, 1928. Serial No. 318,564.

My invention relates to a liquid measure and is an improvment on the type of device covered by the U. S. Patent 1,516,706 for improvement in liquid measures issued Nov. 25, 1924. Such devices must be approved by sealers of weights and measures. In all measures of this kind heretofore made, the means for insuring speedy and substantially complete drainage has been a funnel shaped bottom with a central outlet or a flat bottom mounted in an angular position. Such devices are awkward to handle, expensive to make. and do not completely drain the measure under ordinary conditions of use.

It is the natural habit for the user of one of these devices to allow it to slope or tilt downwardly at the front so that complete and speedy drainage is not always assured.

The principal object of my invention is to provide a liquid measure having such a bottom that the measuring device when held in the ordinary manner will be completely and speedily drained even if the device is allowed to tilt by gravity in the hand of the user.

Another object of my invention is to provide a bottom for a measuring device which is very simple in construction and inexpensive to manufacture. The bottom being struck up from a single piece of sheet metal, the measure is kept light and easy to handle. This is characteristic of these devices made under the former patent and this advantage is not sacrificed.

In the particular embodiment of my invention selected for illustration,

Figure 1:
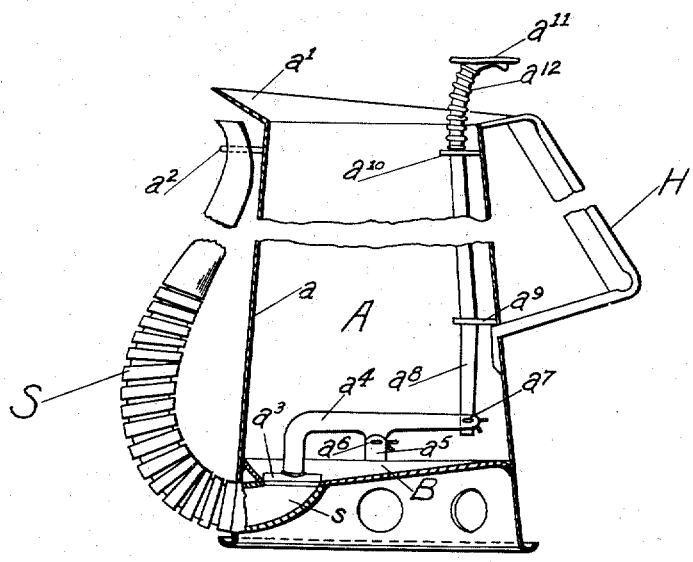
Figure 1 is a vertical axial section through the device from back to front.
Figure 3:
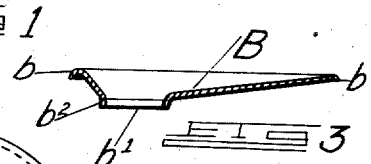
Fig. 3, is a cross section on the line 3—3 of Fig. 2.
Figure 2:
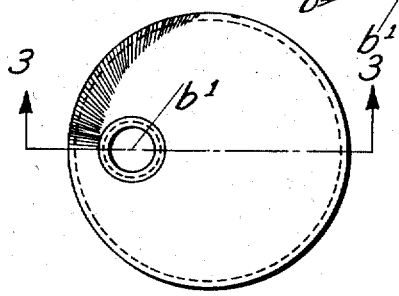
Fig. 2, is a top plan view of the bottom only.

Referring now to the drawing, the measure A has a conical side wall $a$ having a pouring lip $a^1$. Soldered to the inner side wall $a$ and spaced from the bottom of said measure is the bottom B. The bottom B is formed of a single piece of sheet metal with peripheral flange $b$, and outlet $b^1$ having depending flange $b^2$. The outlet opening $b^1$ is near the front edge of the bottom B at its lowest point. The handle H is soldered or otherwise rigidly secured to the back of the device near the top in the usual position to facilitate handling of the measure. Secured to the flange $b^2$ of the bottom B is the discharge elbow $s$. Connected with and forming a continuation of said elbow $s$ is a flexible metal tube S provided for delivery of the liquid measured. The tube S may be held in upright position by means of a hook $a^2$ when not in use.

Discharge through the opening $b^1$ is controlled by an upwardly opening valve $a^3$ of any suitable construction. An elbowed lever arm $a^4$ is secured at one of its ends to the top of the valve $a^3$ and is pivoted to a supporting bracket $a^5$ by pivot pin $a^6$.

Pivoted to the other end of the lever $a^4$ at $a^7$ is a push rod $a^8$ which passes through the supporting guides $a^9$ and $a^{10}$, soldered to the wall $a$. On the top of the rod $a^8$ is a button $a^{11}$. Between the button $a^{11}$ and the guide $a^{10}$ is a spring $a^{12}$ to normally maintain the rod $a^8$ in its highest position and keep the valve $a^3$ closed.

The pouring lip $a^1$ is provided so that the device may be used as an ordinary measuring can when desired.

While I have shown and described a particular means for controlling the flow of liquid through the eccentrically placed outlet, any suitable controlling means may be substituted therefor.

I claim as my invention and desire to secure by Letters Patent of the United States:

1. A liquid measure having in combination, a side wall and a handle secured to the outer surface of the side wall at the back near the top thereof, a bottom horizontally secured within said side wall and spaced above the bottom thereof, an eccentrically placed outlet in said bottom near its front, said bottom sloping downwardly in all directions toward said outlet, a flexible metal discharge spout connected to said bottom underneath said outlet, a valve normally closing said outlet, a lever pivotally mounted between its ends on said bottom, said valve secured to one end of said lever, a push rod pivotally secured to the other end of said lever, guide means secured to the inner surface of said side wall slidably supporting said push rod, and means for holding said rod in raised position normally closing said valve.

2. A liquid measure having in combination, a side wall and a handle secured to the outer surface of the side wall at the back near the top thereof, a bottom formed of a single piece of sheet metal horizontally secured within said side wall and spaced above the bottom thereof, an eccentrically placed outlet in said bottom near its front, a depending flange on said outlet, said bottom sloping downwardly in all directions toward said outlet, a flexible metal discharge spout connected to said bottom underneath said outlet, a valve normally closing said outlet, a lever pivotally mounted between its ends on said bottom, said valve secured to one end of said lever, a push rod pivotally secured to the other end of said lever, guide means secured to the inner surface of said side wall slidably supporting said push rod, and means for holding said rod in raised position normally closing said valve.

3. A liquid measure having in combination, a side wall and a handle secured to the outer surface of the side wall at the back near the top thereof, a bottom horizontally secured within said side wall and spaced above the bottom thereof, an eccentrically placed outlet in said bottom near its front, said bottom sloping downwardly in all directions toward said outlet, a flexible metal discharge spout connected to said bottom underneath said outlet, a valve for closing said outlet, means for opening and closing said valve, a rod pivotally secured to said opening and closing means, guide means for said rod and means for holding said rod in raised position normally closing said valve.

4. A liquid measure having in combination, a side wall, a bottom, a handle secured to the side wall at the back near the top thereof, supporting means preventing said measure from resting on said bottom, an eccentrically placed outlet in said bottom near its front, said bottom sloping downwardly in all directions toward said outlet, a flexible metal discharge spout connected to said bottom underneath said outlet, a valve for closing said outlet, means for opening and closing said valve, a rod pivotally secured to said opening and closing means, guide means for said rod and means for holding said rod in position normally closing said valve.

5. A liquid measure having in combination, a side wall, a bottom, a handle secured to the side wall at the back near the top thereof, supporting means preventing said measure from resting on said bottom, an eccentrically placed outlet in said bottom near its front, said bottom sloping downwardly in all directions toward said outlet, a discharge spout connected to said bottom underneath said outlet, a valve normally closing said outlet and means for opening and closing said valve.

6. A liquid measure having in combination, a side wall, a bottom, a handle secured to the side wall at the back near the top thereof, supporting means preventing said measure from resting on said bottom, an eccentrically placed outlet in said bottom near its front, said bottom sloping downwardly in all directions toward said outlet, a discharge spout connected to said bottom underneath said outlet, a valve normally closing said outlet and means operable by the hand that grasps said handle to hold said measure for opening and closing said valve.

7. A liquid measure having in combination, a side wall, a bottom, a handle secured to the side wall at the back near the top thereof, an eccentrically placed outlet in said bottom near its front, said bottom sloping downwardly in all directions toward said outlet, a flexible metal discharge spout connected to said bottom underneath said outlet, a valve for closing said outlet, means operable by the hand that grasps said handle to hold said measure for opening said valve and means for normally keeping said valve closed.

In testimony whereof, I have signed my name.

WALTER R. BROOKINS.